United States Patent
Lee

(10) Patent No.: US 7,571,253 B2
(45) Date of Patent: Aug. 4, 2009

(54) METHOD FOR PROVIDING VIDEO AND AUDIO DATA TO A PLURALITY OF CLIENTS

(75) Inventor: Jae-hoon Lee, Suwon-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 505 days.

(21) Appl. No.: 11/403,101

(22) Filed: Apr. 11, 2006

(65) Prior Publication Data
US 2007/0153827 A1    Jul. 5, 2007

(30) Foreign Application Priority Data
Dec. 29, 2005    (KR) .................... 10-2005-0133173

(51) Int. Cl.
*G06F 15/16* (2006.01)
(52) U.S. Cl. .................... 709/247; 370/493; 725/143
(58) Field of Classification Search ............ 709/224, 709/247; 370/229, 465, 466, 467, 493; 725/143, 725/145, 146, 148
See application file for complete search history.

(56) References Cited

U.S. PATENT DOCUMENTS

| | | | |
|---|---|---|---|
| 6,724,721 B1 * | 4/2004 | Cheriton | 370/229 |
| 6,816,981 B2 * | 11/2004 | Morita et al. | 714/6 |
| 7,184,397 B1 * | 2/2007 | Wilkie et al. | 370/229 |
| 2001/0025306 A1 * | 9/2001 | Ninokata et al. | 709/218 |
| 2002/0038366 A1 * | 3/2002 | Harasawa | 709/224 |
| 2002/0099842 A1 * | 7/2002 | Jennings et al. | 709/231 |
| 2002/0166119 A1 * | 11/2002 | Cristofalo | 725/34 |
| 2003/0018794 A1 * | 1/2003 | Zhang et al. | 709/231 |
| 2006/0130104 A1 * | 6/2006 | Budagavi | 725/105 |

* cited by examiner

*Primary Examiner*—Moustafa M Meky
*Assistant Examiner*—Randy Scott
(74) *Attorney, Agent, or Firm*—Drinker Biddle & Reath LLP

(57) ABSTRACT

Provided is a method for controlling a video server providing video and audio data to a plurality of clients via a communication network in real time. Analog audio signals and analog video signals are respectively converted into digital audio data and digital video data. The digital audio data and digital video data are compressed. The compressed digital audio data and digital video data are packetized to generate an audio packet and a video packet. The audio packet and video packet are converted into an audio/video RTP packet according to real-time transport protocol. The audio/video RTP packet are transmitted to the clients according to TCP/UDP-IP.

16 Claims, 5 Drawing Sheets

US 7,571,253 B2

METHOD FOR PROVIDING VIDEO AND AUDIO DATA TO A PLURALITY OF CLIENTS

CROSS-REFERENCE TO RELATED PATENT APPLICATION

This application claims the benefit of Korean Patent Application No. 10-2005-0133173, filed on Dec. 29, 2005, in the Korean Intellectual Property Office, the disclosure of which is incorporated herein in its entirety by reference.

BACKGROUND OF THE INVENTION

1. Field of the Invention

The present invention relates to a method for providing video and audio data to a plurality of clients, and, more particularly, to a method for providing video and audio data using a real-time transport protocol that is transmitted via an internet protocol such as TCP-IP or UDP.

2. Description of the Related Art

Video servers are used in remote monitoring systems, broadcasting systems and Internet education systems. Currently, to use a video server in a communication network, a streaming server for real-time transmission must be separately installed. For example, a common carrier or an Internet service provider (ISP) might separately install the streaming server.

SUMMARY OF THE INVENTION

The present invention provides a method for controlling a video server without separately installing a streaming server for real-time transmission in a communication network.

According to an embodiment of the invention, there is provided a method for controlling a video server providing video and audio data to a plurality of clients via a communication network in real time. Analog audio signals and analog video signals are respectively converted into digital audio data and digital video data. The digital audio data and digital video data are compressed. The compressed digital audio data and digital video data are packetized to generate an audio packet and a video packet. The audio packet and video packet are converted into an audio/video RTP packet according to real-time transport protocol. The audio/video RTP packet are transmitted to the clients according to TCP/UDP-IP.

According to another aspect of the present invention, there is provided a computer-readable medium having stored thereon computer-executable instructions for carrying out the method.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
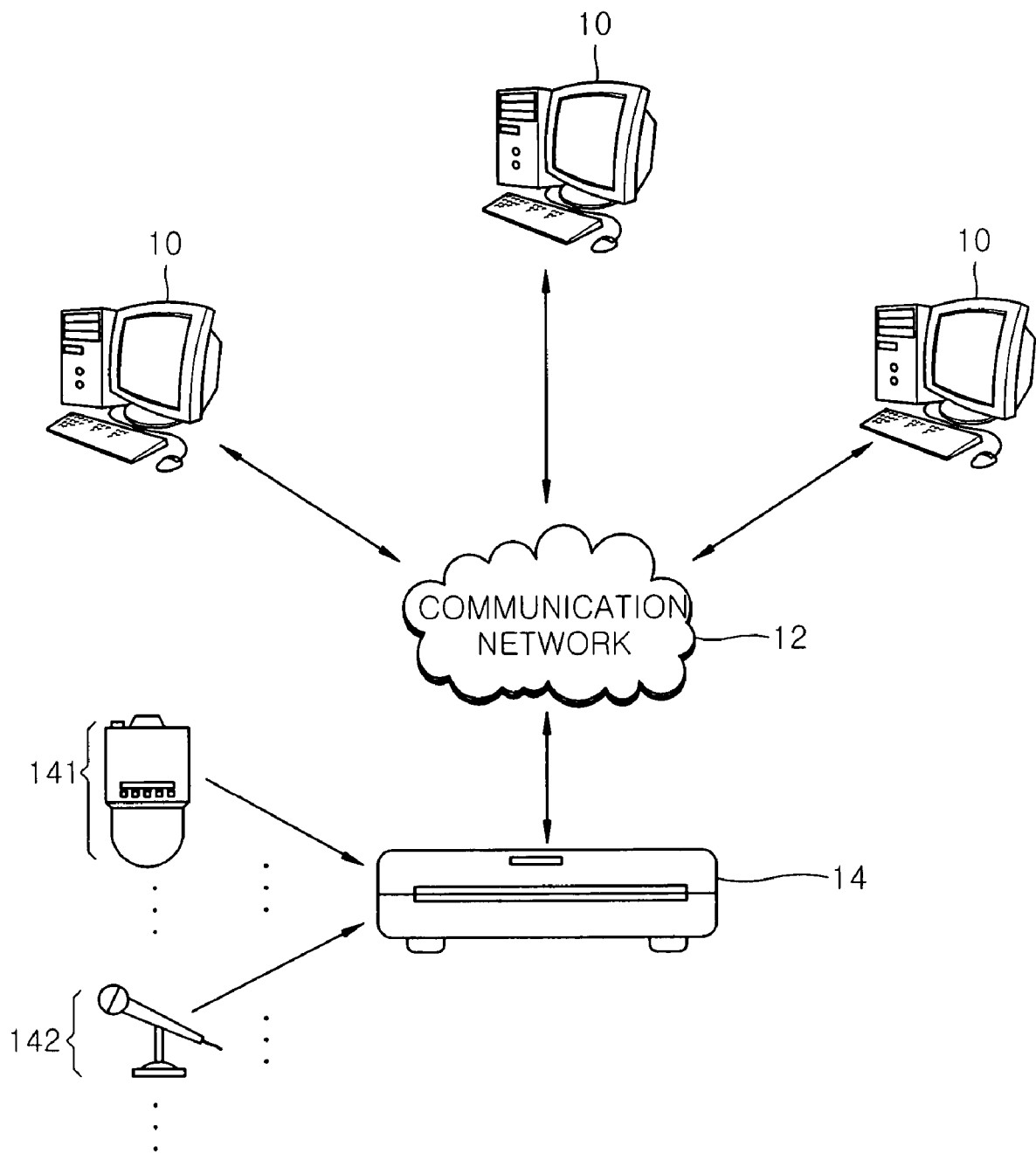
FIG. 1 illustrates a communication network system using a video server according to an embodiment of the invention.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Throughout the drawings, like reference numerals refer to like elements.

FIG. 1 illustrates a system that is configured according to an embodiment of the invention. The system includes client computers 10, a communication network 12, a video server 14, cameras 141, and microphones 142. The client computers 10 and the video server 14 are communicatively linked to the communications network 12, while the cameras 141 and the microphones 142 are communicatively linked to the video server 14. Analog audio signals from the microphones 142 and analog video signals from the cameras 141 are input to the video server 14. The video server 14 converts the analog audio signals and the analog video signals into digital audio data and digital video data and transmits the digital audio data and the digital video data to the clients 10 via the communication network 12.

Figure 2:
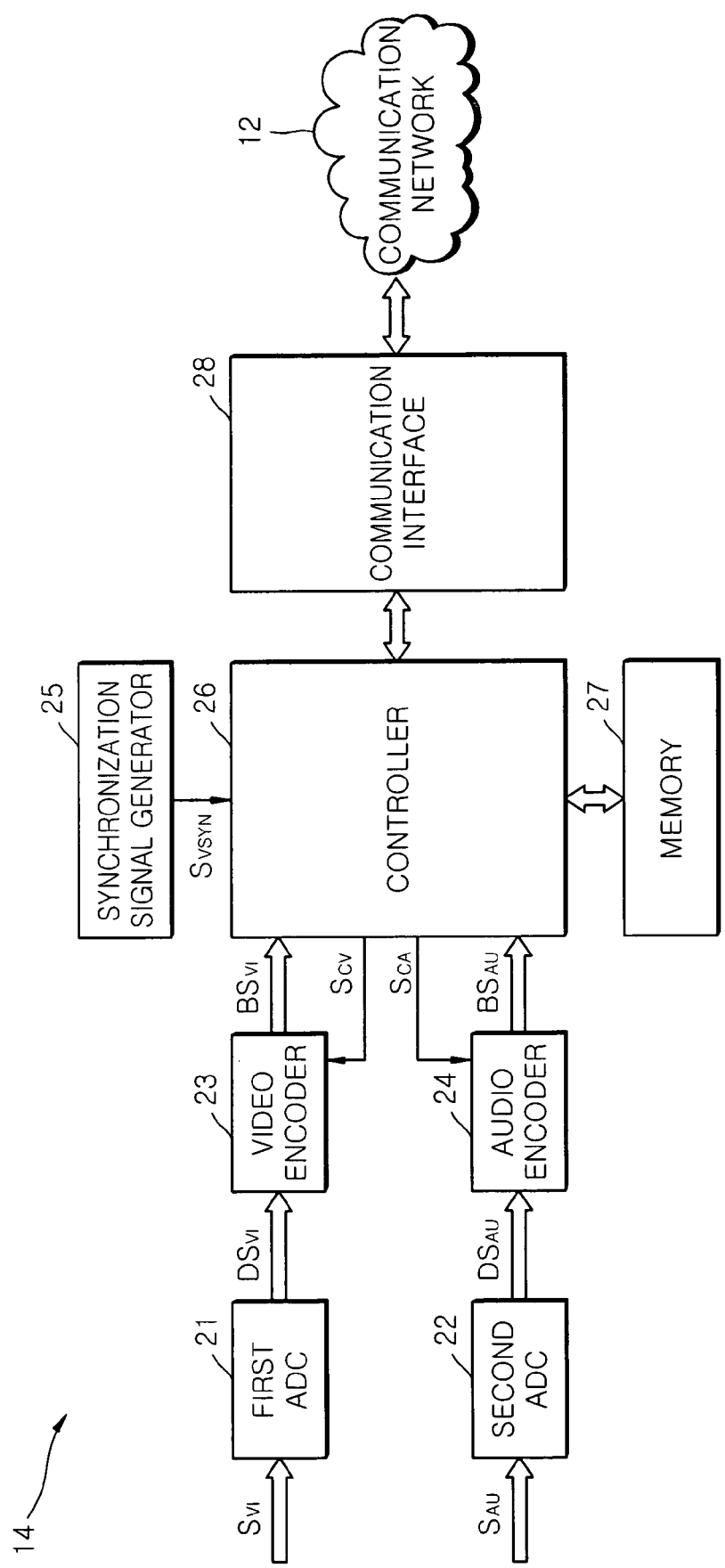
FIG. 2 is a block diagram showing the hardware of the video server of FIG. 1.

Referring to FIG. 2, an example of how the video server 14 of FIG. 1 is configured in an embodiment of the invention will now be described. In this embodiment, the video server 14 includes a first analog-digital converter 21, a second analog-digital converter 22, a video encoder 23, an audio encoder 24, a synchronization signal generator 25, a controller 26, a memory 27, and a communication interface 28.

The first analog-digital converter 21 receives analog video signals $S_{VI}$ from one or more of the cameras 141 (from FIG. 1) and converts these signals into digital video data $DS_{VI}$. The first analog-digital converter 21 then provides the digital video data to the video encoder 23. The second analog-digital converter 22 receives analog audio signals $S_{AU}$ from one or more of the microphones 142 (from FIG. 1) and converts the analog audio signals into digital audio data $DS_{AU}$. The second analog-digital converter 21 then provides the digital audio data to the audio encoder 26.

The video encoder 23 compresses the digital video data $DS_{VI}$ received from the first analog-digital converter 21 according to the MPEG-4 standard, and provides the compressed video data $BS_{VI}$ to the controller 26. The audio encoder 24 compresses the digital audio data $DS_{AU}$ received from the second analog-digital converter 22 according to adaptive differential pulse code modulation (ADPCM), and provides the compressed audio data $BS_{AU}$ to the controller 26.

The controller 26 generates control signals $S_{CA}$ and $S_{CV}$ according to a vertical synchronization signal $S_{VSYN}$ from the synchronization signal generator 25 and client information (i.e., information received from the client computers 10 of FIG. 1) received via the communication interface 28. The control signals $S_{CA}$ and $S_{CV}$ are respectively applied to the audio encoder 24 and the video encoder 23. Furthermore, the controller 26 converts the compressed audio data $BS_{AU}$ received from the audio encoder 24 and the compressed video data $BS_{VI}$ received from the video encoder 23 into an audio/video real-time transport protocol (RTP) packet including a streaming header added pursuant to RTP. During this conversion process, the audio data and video data are temporarily stored in the memory 27.

The audio/video RTP packet is transmitted from the controller 26 to the clients 10 (FIG. 1) through the communication interface 28 and the communication network 12 (FIG. 1). Because the audio/video RTP packet is transmitted according to RTP, there is no need to install a streaming server for real-time transmission in the communication network 12 in order to use the video server 14. In one embodiment, the audio/video RTP packet is wrapped in a TCP/UDP-IP (Transmission Control Protocol/User Datagram Protocol-Internet Protocol) packet prior to being transmitted.

To transmit the audio/video RTP packet, a dynamically varying network bandwidth is measured for each of clients computers 10 and the current transmission rate and compression ratio for each client computer 10 are adjusted in response to the measured network bandwidth. Steps performed to accomplish this adjustment will be explained in detail below with reference to FIG. 5.

Figure 3:
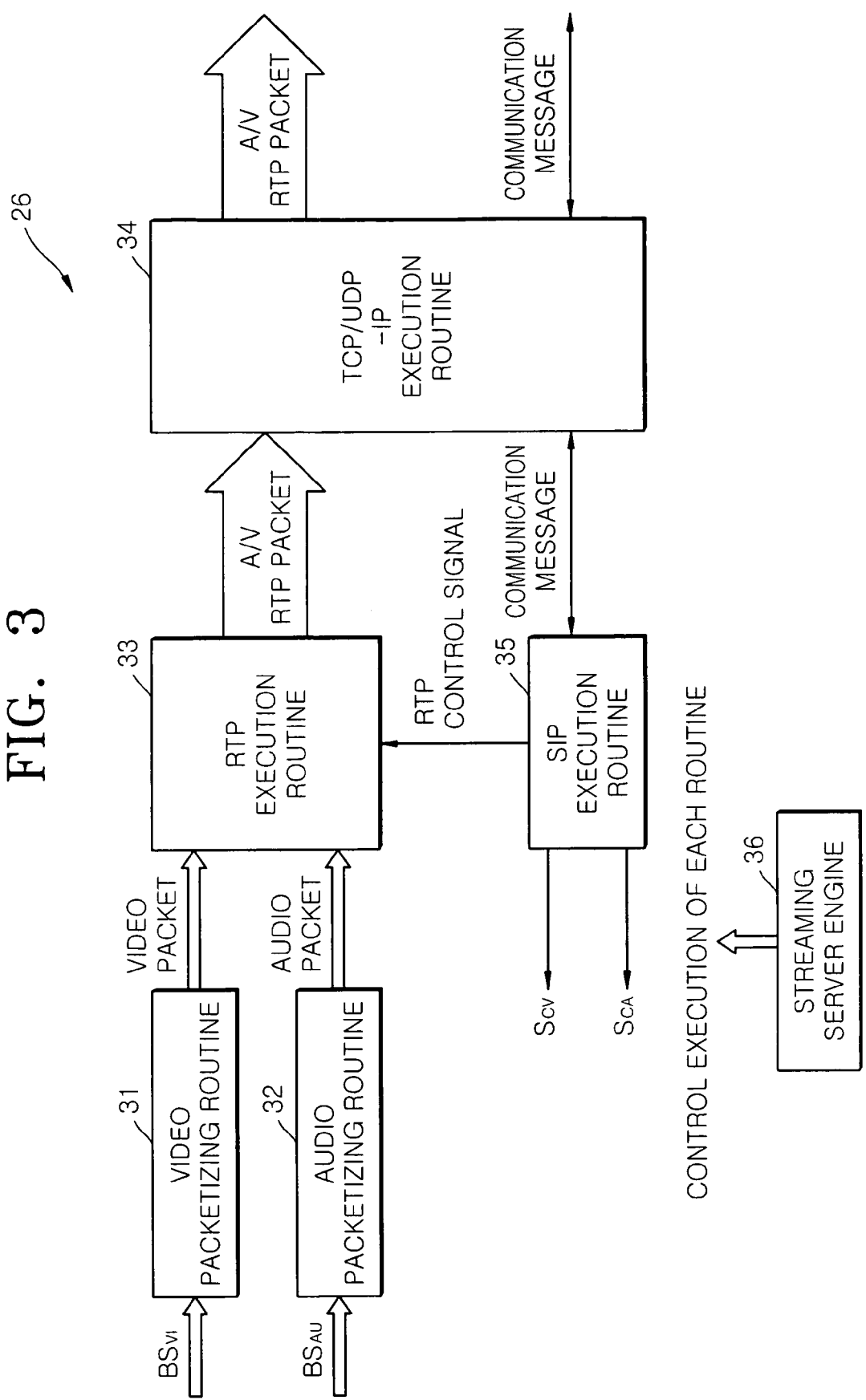
FIG. 3 is a block diagram showing the software executed by the controller of FIG. 2.

Referring to FIG. 3, software that the controller 26 of FIG. 2 executes in an embodiment of the invention will now be described. The software includes a video packetizing routine 31, an audio packetizing routine 32, an RTP execution routine 33, a TCP/UDP-IP execution routine 34, a Session Initiation Protocol (SIP) execution routine 35, and a streaming server engine 36. The streaming server engine 36 controls the execution of each of the routines 31-35. The video packetizing routine 31 receives the compressed video data $BS_{VI}$ input from the video encoder (23 of FIG. 2) in bit stream form, and packetizes it to generate one or more video packets. The audio packetizing routine 32 receives the compressed audio data $BS_{AU}$ input from the audio encoder (24 of FIG. 2) in bit stream form and packetizes it to generate one or more audio packets.

The audio packets generated by the audio packetizing routine 32 and the video packets generated by the video packetizing routine 31 are input to the RTP execution routine 33. The RTP execution routine 33 converts the audio packets from the audio packetizing routine 32 and the video packets from the video packetizing routine 31 into one or more audio/video RTP packets, which include a streaming header. The RTP execution routine 33 can also generate one or more RTP control protocol (RTCP) packets or one or more real-time streaming protocol (RTSP) packets together with the audio/video RTP packets.

The TCP/UDP-IP execution routine 34 wraps the audio/video RTP packets received from the RTP execution routine 33 into TCP/UDIP-IP packets and transmits the TCP/UDP-IP packets to the client computers 10 (FIG. 1).

In cooperation with the session initiation protocol (SIP) execution routine 35, the streaming server engine 36 transmits/receives information about the state of the network (which varies dynamically) and transmits/receives communication messages to/from the client computers 10. The SIP execution routine 35 generates an RTP control signal for controlling the RTP execution routine 33. The SIP execution routine 33 also generates control signals $S_{CA}$ and $S_{CV}$ based on information received from the client computers 10 (FIG. 1). The SIP execution provides the control signals $S_{CA}$ and $S_{CV}$ to the audio encoder and video encoder (24 and 23 of FIG. 4) respectively. Steps performed in carrying out these operations will be explained with reference to FIGS. 4 and 5.

Figure 4:
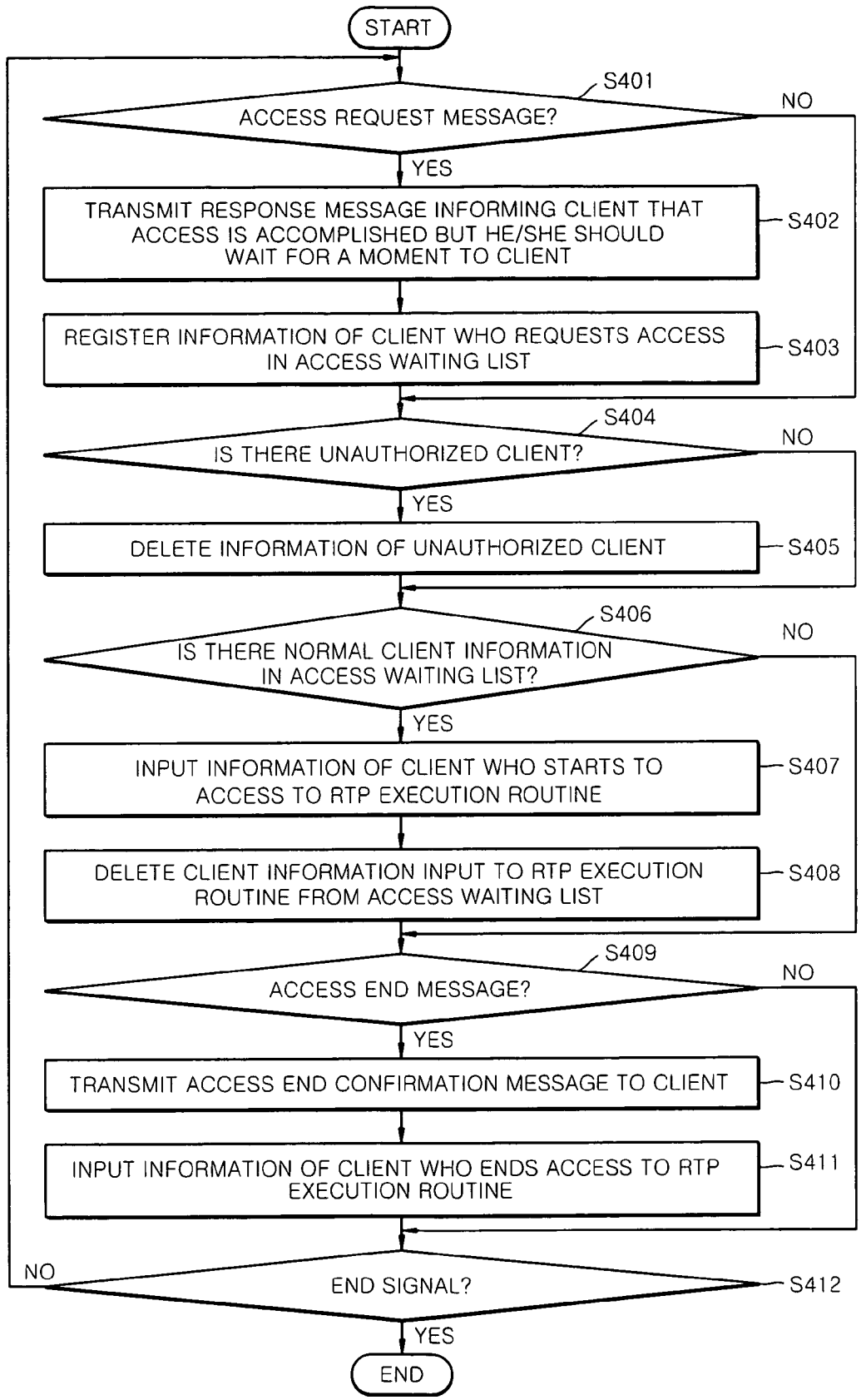
FIG. 4 is a flow chart showing a procedure that a streaming server engine of FIG. 3 uses to communicate with clients using an SIP execution routine.

Referring to FIG. 4, the steps that are performed (in an embodiment of the invention) when the streaming server engine 36 (FIG. 3) communicates With client computers 10 (FIG. 1) using the SIP execution routine 35 (FIG. 3) will now be described. When an access request message is received from a particular client at step S401, a response message that requests the client to wait a moment is transmitted to the client at step S402. Then, information of the client is registered in an access waiting list at step S403.

The access waiting list is checked at step S404. If there is an unauthorized client in the access waiting list, the information for that unauthorized client is deleted from the access waiting list at step S405. This can block ill-intended hacking. Furthermore, this may block the connection of a client who attempts to access in a poor network situation in which a network bandwidth is not secured.

At step S406, the next client in the list wishing access is checked. If the information is normal (e.g., the client is authorized to have access) the information corresponding to that client is input to the RTP execution routine at step S407. Accordingly, the RTP execution routine (33 of FIG. 3) starts to generate one or more audio/video RTP packets for the client. The information for that client is then deleted from the access waiting list in the step S408.

If an access end message is received from the client at step S409, an access end confirmation message is transmitted to the client at step S410. In addition, information regarding the client who ended access is input to the RTP execution routine 33 in the step S411. Accordingly, the RTP execution routine 33 finishes the generation of the audio/video RTP packet or packets for the client.

Steps S401 through S411 are repeated until a user generates an end signal in the step S412.

Figure 5:
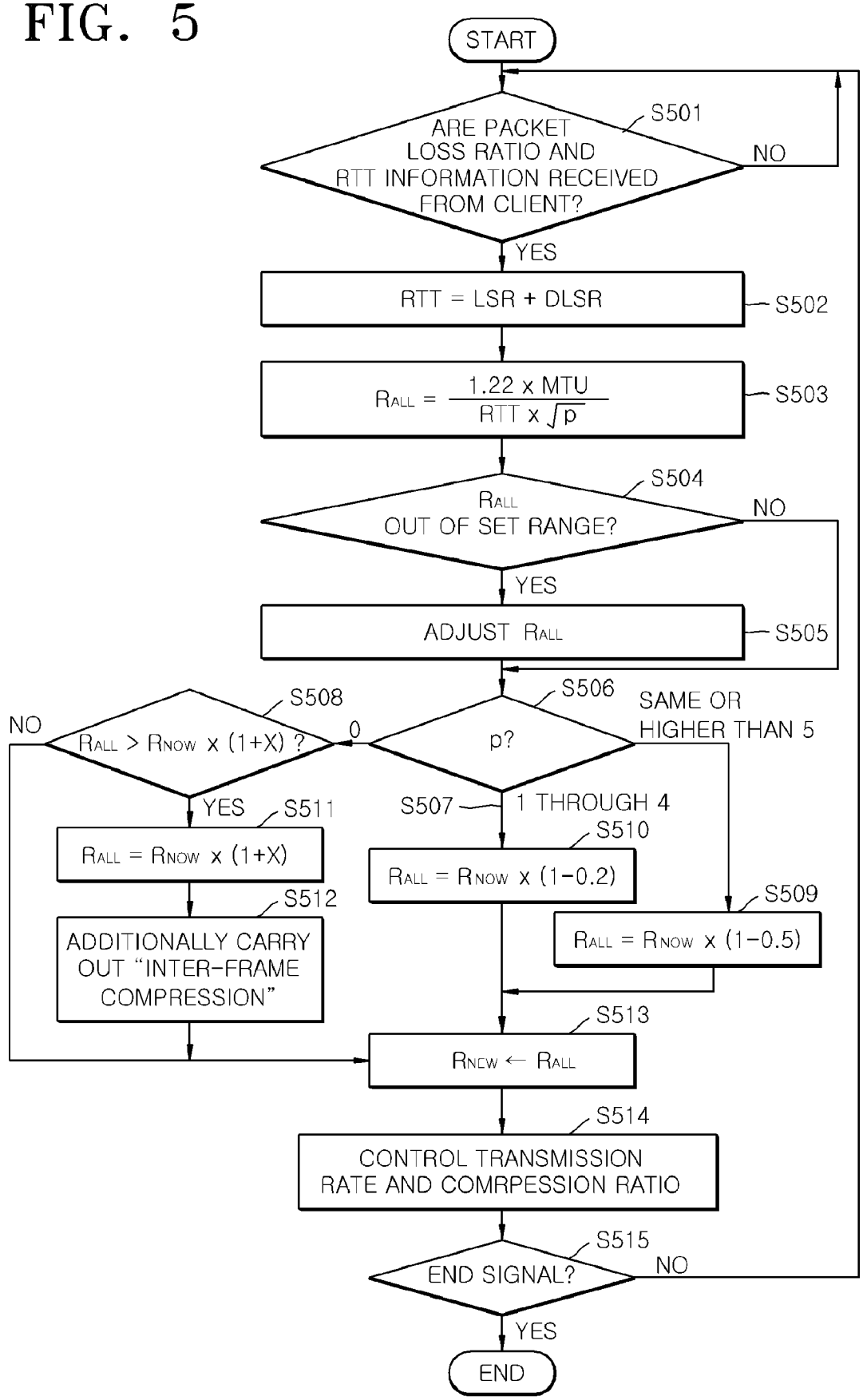
FIG. 5 is a flow chart showing a procedure that the streaming server engine of FIG. 3 uses to adaptively control the current transmission rate and compression ratio in response to a transmission loss ratio and transmission/reception time information from a client.

FIG. 5 is a flow chart showing steps carried by the streaming server engine 36 of FIG. 3 (in an embodiment of the invention) to adaptively control the current transmission rate $R_{NOW}$ and compression ratio in response to a packet loss ratio p as a transmission loss ratio and round trip time (RTT) information as transmission/reception time information received from a client.

To determine the packet loss ratio p, the client computer (10 of FIG. 1) checks a serial number included in the header of the audio/video RTP packet received from the video server (14 of FIG. 1). The RTT information includes a transmission time and a reception time. The client computer transmits a network time protocol (NTP) time stamp included in the header of the audio/video RTP packet received from the video server (14 of FIG. 1) to the video server as the reception time (LSR: transmission time at the side of the video server). In addition, the client measures the transmission time (DLSR: reception time at the side of the video server) of an RTCP packet that was transmitted from the client to the video server and transmits the measured transmission time to the video server.

Accordingly, once the RTT information—the packet loss ratio p, transmission time LSR and reception time DLSR—is received from the client (in a RTCP packet) at step S501, the process moves to step S502, at which the transmission time LSR and reception time DLSR are summed up to obtain RTT.

Subsequently, a first allowable maximum transmission rate $R_{ALL}$, which is proportional to the maximum transmission unit (MTU) (a parameter of a TCP performance model) and inversely proportional to the RTT is calculated at step S503. In one embodiment, the first allowable maximum transmission rate $R_{ALL}$ is calculated using the following equation.

$$R_{ALL} = \frac{1.22 \times MTU}{RTT \times p^{1/2}}$$

When the first allowable maximum transmission rate $R_{ALL}$ is out of a set range, for example, a range of 5 Kbps (Kilo bit per second) through 100 Mbps (Mega bit per second), the first allowable maximum transmission rate $R_{ALL}$ is adjusted at steps S504 and S505. When the first allowable maximum transmission rate $R_{ALL}$ is lower than 5 Kbps, for example, the first allowable maximum transmission rate $R_{ALL}$ is adjusted to be 5 Kbps. When the first allowable maximum transmission rate $R_{ALL}$ is higher than 100 Mbps, it is adjusted to be 100 Mbps.

The first allowable maximum transmission rate $R_{ALL}$ is adjusted in response to the packet loss ratio p to obtain a second allowable maximum transmission rate $R_{ALL}$, and the current transmission rate ($R_{NOW} \rightarrow R_{NEW}$) and compression ratio are controlled in response to the second allowable maximum transmission rate $R_{ALL}$ in the steps S506 through S514. Specifically, when the packet loss ratio p is zero in the step S506, a virtual current transmission rate $R_{NOW} \times (1+X)$ higher than the current transmission rate $R_{NOW}$ by a set rate X is calculated, and then the first allowable maximum transmission rate $R_{ALL}$ is compared to the virtual current transmission rate $R_{NOW} \times (1+X)$ in the step S508.

If, at step S508, it is determined that the first allowable maximum transmission rate $R_{ALL}$ is not higher than the virtual current transmission rate $R_{NOW} \times (1+X)$, the second allowable maximum transmission rate $R_{ALL}$ is set to be equal to the first allowable maximum transmission rate $R_{ALL}$ at step S513. That is, a new current transmission rate $R_{NEW}$ is set to the second allowable maximum transmission rate $R_{ALL}$, and thus the new current transmission rate $R_{NEW}$ becomes equal to the first allowable maximum transmission rate $R_{ALL}$.

If, at step S508, the first allowable maximum transmission rate $R_{ALL}$ is determined to be higher than the virtual current transmission rate $R_{NOW} \times (1+X)$, which means that the first allowable maximum transmission rate $R_{ALL}$ has a largest margin, the second the allowable maximum transmission rate $R_{ALL}$ is set to be equal to the virtual current transmission rate $R_{NOW} \times (1+X)$ at step S511 and the video encoder (23 of FIG. 2) and the audio encoder (24 of FIG. 2) are controlled to perform "inter-frame compression" in addition to "intra-frame compression" at step S512. As is well-known in the art, "intra-frame compression" removes spatial redundancy and "inter-frame compression" removes temporal redundancy.

As described above, the margin of the first allowable maximum transmission rate $R_{ALL}$ can be used to improve transmission and reception performance.

If, at step S506, the packet loss ratio p is determined to be between 1 and 4 (including 1 and 4), the second allowable maximum transmission rate $R_{ALL}$ is set to 0.8 times the current transmission rate $R_{NOW}$ at step S510. If, at step S510, the packet loss rate p is determined to be equal to or greater than 5, the second allowable maximum transmission rate $R_{ALL}$ is set to 0.5 times the current transmission rate $R_{NOW}$ at step S509.

Then, the new current transmission rate $R_{NEW}$ is set to the second allowable maximum transmission rate $R_{ALL}$ in the step S513. Accordingly, the new current transmission rate $R_{NEW}$ is adaptively controlled to be equal to the allowable maximum transmission rate $R_{ALL}$ and compression ratios of the video encoder (23 of FIG. 2) and the audio encoder (24 of FIG. 2) are adaptively controlled in the step S514. Steps S501 through S514 are repeated until a user generates an end signal at step S515.

According to the adaptive control procedure of FIG. 5, a dynamically varying network bandwidth for each client can be automatically measured and the current transmission rate $R_{NOW}$ and compression ratio for each client can be adaptively controlled in response to the measured network bandwidth. This maximizes efficiency of transmission and reception.

The method for controlling a video server according to various embodiments of the invention can be stored in a computer-readable medium on the video server. A computer-readable medium is any data storage device that can store data that can be thereafter read by a computer system. Examples of computer-readable media include read-only memory (ROM), random-access memory (RAM), CD-ROMs, magnetic tapes, floppy disks, optical data storage devices, and carrier waves (such as data transmission through the Internet). The computer-readable medium can also be distributed over networked computer systems so that the computer readable code is stored and executed in a distributed fashion.

As described above, the invention includes a method for controlling a video server and a computer-readable medium for storing code for executing the method. In various embodiments of the invention, an audio packet and a video packet are converted into one or more audio/video RTP packets according to real-time transport protocol. Thus, there is no need to install a separate streaming server for real-time transmission in a communication network in order to use the video server. Furthermore, a dynamically-varying network bandwidth can be automatically measured for each client and the current transmission rate and compression ratio for each client can be adaptively controlled in response to the measured network bandwidth. This can maximize transmission/reception efficiency.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for providing video and audio data to a plurality of clients via a communications network, the method comprising:
   respectively converting live analog audio signals and live analog video signals into digital audio data and digital video data;
   compressing using a current compression ratio for a client the live digital audio data and live digital video data;
   packetizing the compressed live digital audio data and live digital video data to generate an audio packet and a video packet;
   converting the audio packet and video packet into a real-time transport protocol packet according to real-time transport protocol;
   wrapping the real-time transport protocol packet to the clients into an internet protocol packet;
   transmitting the internet protocol packet to the client at a current transmission rate for the client;
   receiving transmission loss ratio data, transmission time data, and reception time data from each of the plurality of clients;
   calculating a maximum transmission rate that is proportional to a maximum performance for internet protocol and inversely proportional to the transmission loss ratio, transmission time, and reception time;
   dynamically adjusting the current transmission rate by
   if the packet loss ratio is greater than approximately zero, then lowering the current transmission rate and increasing the current compression rate and not using inter-frame compression;
   and if the packet loss ratio is approximately zero, then increasing the current transmission rate;

and if the packet loss ratio is approximately zero and the maximum transmission rate is significantly larger than the increased current transmission rate, then using inter-frame compression; and for each client repeating the above steps until receiving an end signal from the client or the live video or the live analog audio signals ends.

2. The method of claim 1, wherein, when the real-time transport protocol packet is transmitted to the clients, communication messages are transmitted and received to and from the clients according to a session initiation protocol.

3. The method of claim 1, further comprising:
obtaining information regarding the plurality of clients when the real-time transport protocol packet is transmitted to the plurality of clients; and
using the obtained information to configure how the audio packet and video packet are converted into the real-time transport protocol.

4. The method of claim 1, further comprising:
when an access request message is received from a client of the plurality, transmitting a response message informing the client that access is accomplished but that the client should wait; and
registering information regarding the client in an access waiting list.

5. The method of claim 4, further comprising:
determining whether there is an unauthorized client in the access waiting list;
and, based on the determining step, deleting the unauthorized client from the access waiting list.

6. The method of claim 5, further comprising:
identifying an authorized client in the access waiting list; and
converting the audio packet and video packet into the real-time protocol packet using information regarding the authorized client obtained from the access waiting list.

7. The method of claim 4, further comprising:
detecting an attempt by the client to gain access;
using the registered information of the client to convert audio packet and video packet into the real-time transport protocol packet.

8. The method of claim 7, further comprising:
upon completion of the transmitting step, deleting the registered information from the access waiting list.

9. The method of claim 1, further comprising:
when an access end message is received from a client of the plurality, transmitting an access end confirmation message to the client; and
ceasing the generation of the real-time protocol packets for the client.

10. The method of claim 1, further comprising:
receiving, from each client of the plurality of clients, data regarding a transmission loss ratio, a transmission time, and a reception time; and
controlling the current transmission rate of the real-time protocol packet based on the transmission loss ratio, the transmission time, and the reception time.

11. A method for providing video and audio data to a plurality of clients via a communication network, the method comprising:
converting live analog audio signals into digital audio data;
converting live analog video signals into digital video data;
compressing using a current compression ratio for a client the live digital audio data and the live digital video data;
packetizing the compressed digital audio data and live digital video data to generate an audio packet and a video packet;
converting the audio packet and video packet into real-time transport protocol packet;
wrapping the real-time transport protocol packet to the clients into an internet protocol packet;
transmitting the internet protocol packet to the client at a current transmission rate for the client;
receiving transmission loss ratio data, transmission time data, and reception time data from each of the plurality of clients;
calculating a maximum transmission rate that is proportional to a maximum performance for internet protocol and inversely proportional to the transmission loss ratio, transmission time, and reception time;
dynamically adjusting the current transmission rate and the current compression rate, by
if the packet loss ratio is greater than approximately zero, then lowering the current transmission rate and increasing the current compression rate and not using inter-frame compression;
and if the packet loss ratio is approximately zero, then increasing the current transmission rate;
and if the packet loss ratio is approximately zero and the maximum transmission rate is significantly larger than the increased current transmission rate, then using inter-frame compression;
for each client repeating the above steps until receiving an end signal from the client or the live video or the live analog audio signals ends.

12. The method of claim 11, wherein each of the plurality of clients determines the transmission loss ratio by checking a serial number included in the header of the real-time transport protocol packet.

13. The method of claim 11, wherein a real-time protocol control packet is transmitted together with the real-time transport protocol packet when the real-time transport protocol packet is transmitted to the plurality of clients.

14. The method of claim 13, wherein the transmission loss ratio data, transmission time data, and reception time data are included in the real-time protocol control packet.

15. The method of claim 14, wherein each of the plurality of clients determines the transmission time and the reception time by summing up the transmission time data and the reception time data included in the real-time protocol control packet.

16. A computer-readable medium having stored thereon computer-executable instructions for performing steps comprising:
respectively converting analog audio signals and live analog video signals into digital audio data and digital video data;
compressing using a current compression ratio for a client the live digital audio data and live digital video data;
packetizing the compressed live digital audio data and live digital video data to generate an audio packet and a video packet;
converting the audio packet and video packet into a real-time transport protocol packet according to real-time transport protocol;
wrapping the real-time transport protocol packet to the clients into an internet protocol packet
transmitting the internet protocol packet to the client at a current transmission rate for the client
receiving transmission loss ratio data, transmission time data, and reception time data from each of the plurality of clients;
calculating a maximum transmission rate that is proportional to a maximum performance for internet protocol and inversely proportional to the transmission loss ratio, transmission time, and reception time;

dynamically adjusting the current transmission rate by if the packet loss ratio is greater than approximately zero, then lowering the current transmission rate and increasing the current compression rate and not using inter-frame compression;

and if the packet loss ratio is approximately zero, then increasing the current transmission rate;

and if the packet loss ratio is approximately zero and the maximum transmission rate is significantly larger than the increased current transmission rate, then using inter-frame compression; and for each client repeating the above steps until receiving an end signal from the client or the live video or the live analog audio signals ends.

* * * * *